United States Patent [19]

Baumann

[11] 3,955,591
[45] May 11, 1976

[54] INSERT TYPE SLIDING GATE VALVE

[76] Inventor: Hans D. Baumann, 548 Manville Road, Woonsocket, R.I. 02895

[22] Filed: Mar. 5, 1975

[21] Appl. No.: 555,361

[52] U.S. Cl.............................. 137/270; 137/625.3; 137/625.33; 251/176; 251/326
[51] Int. Cl.²........................................ F16K 11/06
[58] Field of Search............ 137/625.3, 625.33, 270; 251/326, 176

[56] References Cited
UNITED STATES PATENTS

| | | | |
|---|---|---|---|
| 828,280 | 8/1906 | Firey | 251/176 |
| 2,827,260 | 3/1958 | Jordan | 137/625.33 X |
| 3,183,926 | 5/1965 | Boudot | 251/326 X |
| 3,517,697 | 6/1970 | Hott, Jr. et al. | 137/625.33 |
| 3,696,831 | 10/1972 | Fowler et al. | 251/327 X |
| 3,752,188 | 8/1973 | Sage | 137/625.3 X |

*Primary Examiner*—Arnold Rosenthal

[57] ABSTRACT

A reciprocating sliding gate valve with tubular housing and one movable and one stationary gate having multiple fluid conducting ports, which overlap with solid wall partitions spaced between said ports when the valve is closed following sliding, reciprocating displacement of the movable gate, and wherein the interface between the stationary gate and the tubular body bore is sealed by the usual pipe line flange gasket; both gates and other internal parts being readily removable through one end of the tubular housing bore for ease of assembly.

3 Claims, 3 Drawing Figures

INSERT TYPE SLIDING GATE VALVE

BACKGROUND AND BRIEF SUMMARY OF THE INVENTION

This invention relates to improvements in the art of sliding gate valves. Sliding gate type throttling valves have been known for some time. However, their construction has been cumbersome and expensive in that the inner valve parts were contained between machined and flanged (separately cast) housing parts. The stationary plate member had to be sealed against at least one machined surface within said cast housing and further seals have to be implemented to prevent fluid from leaking out at the intersection between the two housing halves.

In contrast, the housing of my invention is made from tubular bar stock, eliminating the possibility of a porous casting. There are no internal seals, since the stationary plate member abuts and seals directly against the ordinary pipe line flange gasket, thereby eliminating at once the commonly feared possibility of leakage between valve seat (stationary plate) and the retaining housing. Furthermore, all internal valve parts are readily removable through one end of the tubular bar stock housing for ultimate ease of assembly and maintenance.

The absence of cast, separate retaining housing shells allows the design of a tubular bar stock body to fit snugly within the inner periphery of the circle of bolts connecting a pair of companion pipe line flanges, i.e. there is no longer need for separate valve housing flanges, thereby effecting great cost savings.

A further object of the invention is the ability to invert the movable plate 180°, in order to reverse the direction of opening or closing without need for additional parts or readjustment of valve stems.

Finally, in contrast to present state of the art devices, my invention completely eliminates all fasteners, such as nuts or pins connecting the valve stem with the sliding gate and which can corrode or dislodge during service and thereby pose a threat to reliable service of the valve.

These and other advantages of my invention will become apparent from a study of the following detailed description and drawings.

DETAILED DESCRIPTION OF THE INVENTION

Figure 1:
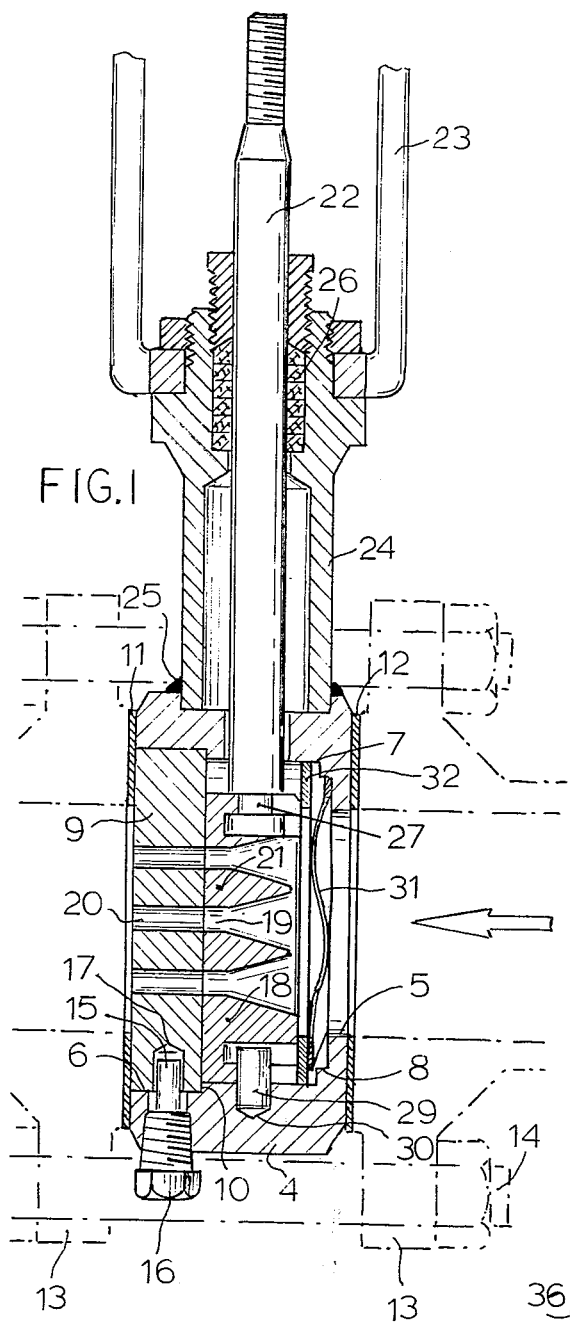
FIG. 1 is a vertical sectional view of the preferred embodiment of my invention, being installed between pipe line flanges (indicated by dashed lines) and with conventional actuating means omitted.

My invention, as shown primarily in FIG. 1, consists of a housing 4 made preferredly from round steel bar and having a longitudinal bore 5 and three consecutively enlarging counter bores 6, 7, and 8. Counter bore 6 slidingly engages a circular and stationary plate 9 of which one perpendicular surface abuts a step shoulder 10 forming a termination of counter bore 6, while the other perpendicular surface aligns with one of the two perpendicular facings of housing 4, defined as the outlet side, and together share and engage the radial width of a pipe line gasket 11 which effectively seals the interface between plate 9 and housing 4. A similar pipe line gasket 12 attaches to the second perpendicular face of housing 4 at, what should be considered, the inlet side. Both gaskets 11 and 12 are compressed and housing 4 being retained while in service between a pair of conventional pipe line flanges 13 (shown in dashed lines), forming parts of a fluid system, by suitable tie-rods 14.

A pin 15, being part of a pipe plug 16, engages in a recess 17 of plate 9 to retain the latter during shipment and other periods, where the valve is not installed between flanges. The one perpendicular face of plate 9 facing the inlet side is lapped to a highly flat and polished finish and engages with a similarly lapped surface of a second sliding gate 18 having a number of evenly spaced rows of horizontal slots (or rows of drilled holes) 19 of which the cross-section enlarges towards the valve inlet to provide minimum constriction for a passing fluid. The position of plate 18, as shown in FIG. 1, corresponds to the full open valve position, i.e. the lower portion of plate 18 engages the inside of counter bore 7 and all slots 19 line up with an identical number and equally dimensioned row of holes 20 in stationary plate 9, thereby providing a nearly unobstructed passage for the flowing medium.

However, solid walled portions 21, having a greater width than that of horizontal slots 19, begin to overlap the passages in plate 9 upon upward movement of plate 18 until at maximum stroke all of holes 20 are covered and the valve is closed.

The lifting of plate 18 is accomplished by means of a valve stem 22 of which the upper portion engages with the movable parts of a reciprocating actuator 23 of conventional design or a hand wheel (not shown) and which is sealed within a bonnet portion 24, preferredly welded to housing 4 at an opening 25, by conventional packing means 26. The lower portion of stem 22 has a groove cut in, thereby forming a smaller diameter portion 27 and a T-head configuration, which snugly engages one of a pair of similarly shaped milled slots 28 cut into the upper and lower extremities of plate 18. Each of said milled slots 28 is open towards the inlet side of the valve, thereby permitting a sliding engagement of the lower end of stem 22, when plate 18 is inserted from the outlet end of the valve (after removal of plate 9 and pin 15). An additional pin 29 located on the same vertical axis as stem 22 and being pressed into a bore 30 of housing 4 and having the same diameter as stem portion 27, provides additional guiding for plate 18 in the vertical direction.

Figure 3:
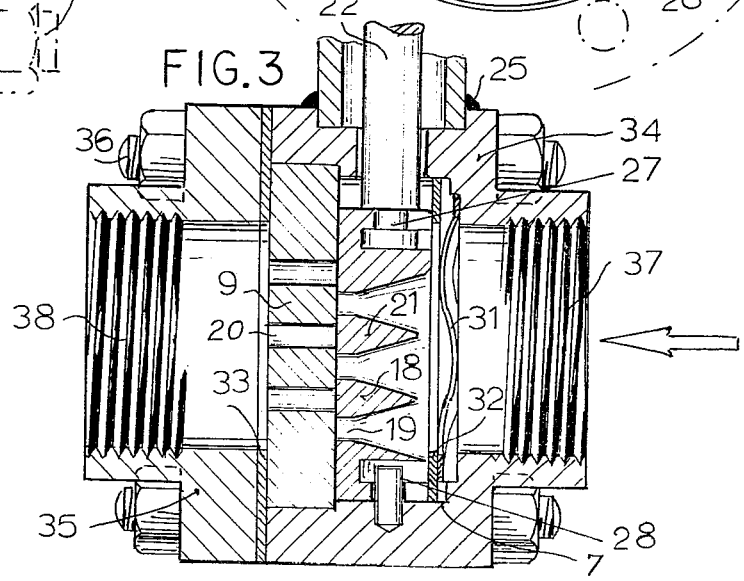
FIG. 3 is a part of a vertical sectional view of an alternate embodiment of my invention suitable to be connected to pipe line by thread.

When inverting plate 18 by 180°, as shown in FIG. 3, the mode of operation is exactly reversed, that is, wall portions 21 now completely cover passages 20, when the lower extremity of plate 18 touches counter bore 7 and the valve will be completely open upon full lifting of stem 22. Note, that recess 27 of stem 22 now engages the milled slot 28, formerly occupied by pin 29 and vice versa.

While fluid pressure differential across the valve normally keeps plate 18 pressed against stationary plate 9, there are times when an auxiliary force is desirable. Such force is provided by a weave type of circular spring 31 contained within counter bore 8 and exerting its force against a lubricated washer 32, which in turn slidingly engages movable plate 18. Note, that the out-side diameter of washer 32 snugly guides in body counter bore 7, thereby effectively preventing solids or other undesirable particles from lodging beneath the lower extremity of plate 18 and thereby from interfering with the proper operation of the valve.

Figure 2:
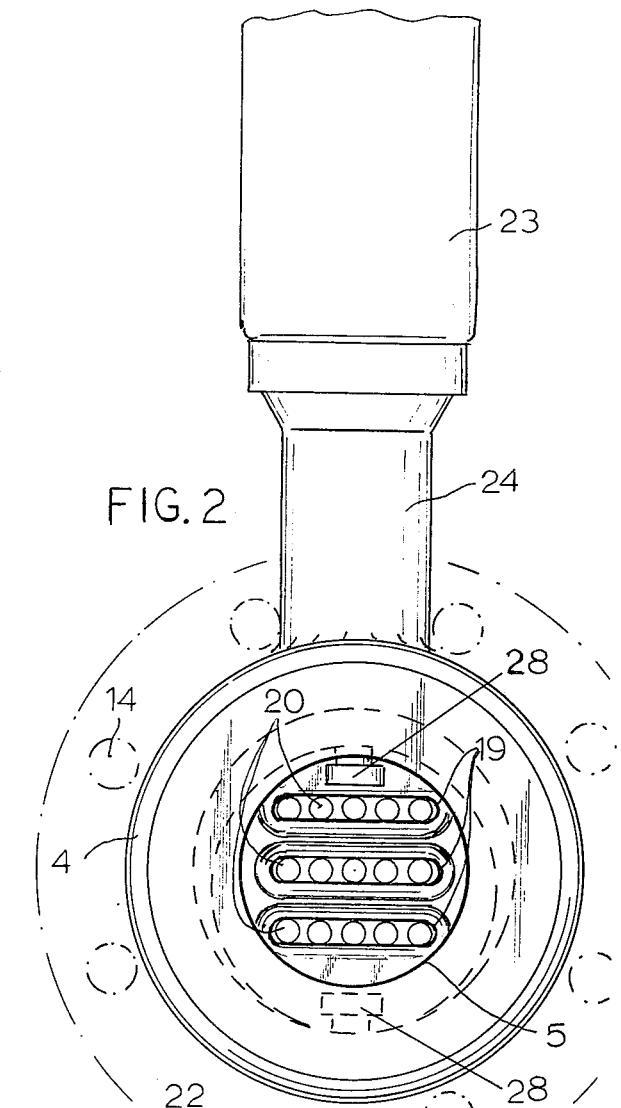
FIG. 2 is a side view of the embodiment illustrated in FIG. 1, when viewed from the up-stream side of the pipe line.

Referring to FIG. 3, an embodiment of my invention is shown which allows the connection of my valve to pipe lines having screwed ends. While the inner parts and the operation of the valve is identical to that of FIG. 1 and FIG. 2, line gasket 11 is now replaced by a similar gasket 33 being retained between a square shaped housing 34 made out of bar stock and a flange type counter part 35 aided by four bolts 36. Both, the bore of counter part 35 and the longitudinal bore of housing 34 are now threaded to accept a screwed pipe connection at inlet port 37 and outlet port 38.

Numerous minor modifications to the design of my invention can be made, for example by replacing the weave type spring by a belleville type spring, without departing from the scope of the following attached claims:

I claim:

1. Insert type sliding gate valve comprising:
   a. a tubular housing;
   b. one inlet and one outlet end formed in said housing, said inlet and outlet ends adapted to be coupled to pipeline flanges and to intermediate gaskets acting as sealing means between said inlet and outlet ends and said pipeline flanges;
   c. a straight cylindrical passage formed in said housing and extending from the outlet end of said housing towards a shoulder near the other end of said housing providing at that point a reduced cross-section, said passage additionally having a slightly enlarged diameter portion near the outlet end, terminating in a stop shoulder within said housing, and further containing guiding means located at the lower part of said cylindrical passage;
   d. a bonnet extending radially outward and being suitably connected at the upper extremity of said housing and containing within a reciprocating valve stem, the lower tip of which provides coupling means;
   e. a circular plate slidingly engaged within the slightly enlarged diameter portion near the outlet side of said housing and having perpendicular extending parallel surfaces, one of which abuts the stop shoulder within said housing, while the opposite surface aligns with said outlet end of the housing, both of which engage one of said pipeline flange gaskets to effectively seal the interface between said slightly enlarged diameter portion of the housing and the outer diameter of said circular plate; said circular plate further having one or more horizontal passages formed therein, said passages being located on and in symmetric relationship to the horizontal axis of said circular plate;
   f. a second movable plate having a flat plane surface which slidingly engages the perpendicular extending surface of said first circular plate, which abuts the stop shoulder within the housing, said movable plate being loosely confined within the cylindrical passage of said housing and having an external diameter which is reduced from the internal diameter of said cylindrical passage by a distance which slightly exceeds the vertical cross-sectional dimension of said passages within said first circular plate, said second plate having one or more horizontal passages formed therein at a location sufficiently transposed from the horizontal axis of the movable plate, so that the passages are in registry with the passages of said first plate when the external cylindrical surface of the movable plate is in contact with the inside wall surface of said cylindrical passage, said movable plate further being provided with a pair of identical coupling means located opposite to each other along the vertical axis of the plate to engage with said reciprocating valve stem on one end and with said guiding means on the other end;
   g. spring means retained within said housing and engaging and exerting a force against said movable plate.

2. A valve of claim 1, wherein said coupling means comprise a T-head shaped portion of circular cross-sections as part of said reciprocating stem slidingly engaging a similarly shaped opening partly penetrating the upper extremities of said movable plate from the side of the plate facing the up-stream end of said valve body, and wherein said movable plate has a second, identical T-head opening near the lower extremity slidingly engaging said guiding means of the housing.

3. A valve as described in claim 1, wherein said spring means comprise a metallic compressible circular wave spring retained within a recess of the housing bore and a bearing washer having an external diameter to snugly fit the diameter of the straight cylindrical passage within said housing, said bearing washer engaging the outer periphery of the up-stream face of said movable plate on one side and the compressible circular wave spring on the other side.

* * * * *